(12) United States Patent
Nonoshita et al.

(10) Patent No.: US 7,503,864 B2
(45) Date of Patent: Mar. 17, 2009

(54) BICYCLE SPROCKET

(75) Inventors: Tetsu Nonoshita, Izumi (JP); Hideya Inoue, Sakai (JP)

(73) Assignee: Shimano Inc., Osaka (JP)

( * ) Notice: Subject to any disclaimer, the term of this patent is extended or adjusted under 35 U.S.C. 154(b) by 225 days.

(21) Appl. No.: 11/287,354

(22) Filed: Nov. 28, 2005

(65) Prior Publication Data

US 2006/0205549 A1 Sep. 14, 2006

(30) Foreign Application Priority Data

Mar. 9, 2005 (JP) ............................. 2005-064732

(51) Int. Cl.
  *F16H 55/30* (2006.01)
(52) U.S. Cl. .................................... 474/160
(58) Field of Classification Search .................. 474/78, 474/79, 80, 150, 152, 158, 160, 161, 175
  See application file for complete search history.

(56) References Cited

U.S. PATENT DOCUMENTS

| | | | | |
|---|---|---|---|---|
| 3,200,665 | A | * | 8/1965 | Wells ........................... 74/446 |
| 3,469,465 | A | | 9/1969 | Bebbington, Jr. et al. |
| 3,909,387 | A | * | 9/1975 | Kolic et al. ................. 204/206 |
| 4,318,310 | A | | 3/1982 | Segawa |
| 4,453,924 | A | * | 6/1984 | Sugino ........................ 474/160 |
| 4,475,894 | A | * | 10/1984 | Sugino ........................ 474/144 |
| 4,586,914 | A | * | 5/1986 | Nagano ....................... 474/160 |
| 4,589,860 | A | | 5/1986 | Brandenstein et al. |
| 4,869,709 | A | * | 9/1989 | Nagano ....................... 474/152 |
| 5,360,378 | A | | 11/1994 | Suzuki et al. |
| 5,852,951 | A | | 12/1998 | Santi |
| 6,064,027 | A | | 5/2000 | Santi |
| 6,993,993 | B2 | * | 2/2006 | Konishi et al. ................. 74/446 |
| 2005/0032596 | A1 | * | 2/2005 | Nonoshita et al. ........... 474/175 |
| 2005/0282672 | A1 | * | 12/2005 | Nonoshita .................... 474/161 |
| 2006/0205549 | A1 | * | 9/2006 | Nonoshita et al. ........... 474/160 |

FOREIGN PATENT DOCUMENTS

| | | |
|---|---|---|
| DE | 20218755-UA | 2/2003 |
| EP | 0002964 A1 | 7/1979 |
| FR | 983303 | 6/1951 |
| JP | 56-147960 A | 11/1981 |
| JP | 59-104890 | 7/1984 |
| JP | 63-180768 A | 7/1988 |

(Continued)

*Primary Examiner*—Vicky A Johnson
(74) *Attorney, Agent, or Firm*—Global IP Counselors, LLP

(57) ABSTRACT

A bicycle sprocket basically has a metallic sprocket ring part and a synthetic resin fastening part that is configured to ensure that weight can be reduced and that loss of fastening force resulting from deterioration or deformation of the synthetic resin can be prevented. The metallic sprocket ring part includes a ring element with a plurality of sprocket teeth located on an outer periphery of the ring element, a plurality of connecting elements located on an inner periphery of the ring element and a plurality of internal fastening elements located on radial inner ends of the connecting elements, respectively. The synthetic resin fastening part is non-movably formed on both axial faces of the sprocket ring part at a location radially inwardly of the sprocket teeth so as to cover at least a portion of the inner periphery of the ring element, the connecting elements, and the internal fastening elements.

19 Claims, 12 Drawing Sheets

FOREIGN PATENT DOCUMENTS

| | | |
|---|---|---|
| JP | 63-126658 U | 8/1988 |
| JP | 63-126659 U | 8/1988 |
| JP | 63-126660 U | 8/1988 |
| JP | 63-126661 U | 8/1988 |
| JP | 63-137164 U | 9/1988 |
| JP | 05-112278 | 5/1993 |
| JP | 2003-328141 | 11/2003 |
| JP | 3583385 B2 | 11/2004 |
| JP | 2005-053410 | 3/2005 |
| TW | M250876 U | 11/2004 |

* cited by examiner

BICYCLE SPROCKET

CROSS-REFERENCE TO RELATED APPLICATIONS

This application claims priority under 35 U.S.C. § 119 to Japanese Patent Application No. 2005-064732. The entire disclosure of Japanese Patent Application No. 2005-064732 is hereby incorporated herein by reference.

BACKGROUND OF THE INVENTION

1. Field of the Invention

This invention generally relates to a sprocket. More specifically, the present invention relates to a bicycle sprocket that is configured to be mounted on the rotating drive unit of a bicycle, and that is configured to engage a bicycle-driving chain that is to be wrapped around the external periphery of the bicycle sprocket.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle sprocket.

When a plurality of sprockets are mounted to the gear crank and free hub in order to provide multiple gears, aluminum is used as the material in order to reduce weight.

A bicycle is generally provided with a drive unit or drive train having front and rear sprockets and a chain wrapped around the sprockets. The front gear crank (one example of a rotating drive unit) of the bicycle has one or more front sprockets, while the free hub (one example of a rotating drive unit) of the bicycle has one or more rear sprockets. This type of bicycle sprocket is made of such materials as an aluminum alloy having the designation A2014P under the standard JIS H4000 (category) or iron having the designation SPCC under the standard JIS G3141 (category). When the gear crank or the free hub has a plurality of sprockets in order to provide multiple gears, aluminum is used as the material in order to reduce the weight.

There are also known bicycle sprocket designs that reduce the weight even further by having a sprocket ring part made of an aluminum alloy with sprocket teeth formed thereon, and a fastening part made of a carbon fiber material that is mounted on the internal periphery of the sprocket ring part and fastened to the gear crank (for example, see German Utility Model Publication No. 20218755). In this sprocket, the internal periphery of the sprocket ring part and the fastening part are fastened together by installing metallic crimping pins in semicircular holes formed in the sprocket ring part and the fastening part. Also, a gap is formed between the sprocket ring part and the fastening part to prevent them from deforming due to the weather as a result of using two members. Furthermore, mounting holes with steps are formed in the fastening part of the gear crank. In a sprocket with such a configuration, normally a bolt (one example of a fastening member) is inserted through the mounting holes to fasten the sprocket to a spider arm of the gear crank.

Another known practice to assist gear shifting is to provide the sprocket with pin members for guiding the chain over the sprocket teeth, which are referred to as spikes or spike pins and sub-spikes or sub-spike pins (for example, see Patent Gazette No. 3583385 Specification). The spike pins are fastened by crimping in fastening holes formed at intervals in the sprocket ring part. The sub-spike pins are fastened by crimping in fastening holes formed farther in on the sprocket ring part than the spike pins and farther upstream of the spike pins in the direction of rotation. The spike pins and sub-spike pins protrude from the larger sprocket to the smaller sprocket.

In the conventional bicycle sprocket previously described, loss of the fastening force between the fastening part and the spider arm (rotating drive unit) can occur as a result of deterioration over time in the synthetic resin constituting the fastening part. Also, the fastening part made of a synthetic resin deforms if the bolt is fastened with excessive torque, which may of course result in a loss of the fastening force.

Also, in the conventional bicycle sprocket previously described, both parts are fastened by crimping pins. When both parts are fastened by crimping pins in this manner, backlash is likely to occur between the two parts. Furthermore, in a conventional sprocket, a gap is formed between the two parts to prevent deformation due to the weather. Therefore, rigidity between the sprocket ring part and the fastening part must be ensured only by the crimping pins, and it is difficult to maintain high rigidity. Also, when the sub-spike pins are disposed farther in than the spike pins, it is difficult to firmly fasten the sub-spike pins in place if a situation arises in which the sub-spike pins must be disposed closer to the fastening part.

In view of the above, it will be apparent to those skilled in the art from this disclosure that there exists a need for an improved bicycle sprocket. This invention addresses this need in the art as well as other needs, which will become apparent to those skilled in the art from this disclosure.

SUMMARY OF THE INVENTION

One object of the present invention is to provide a bicycle sprocket having a fastening part made of a synthetic resin in which the bicycle sprocket is configured to ensure that weight can be reduced and that loss of fastening force resulting from deterioration or deformation of the synthetic resin can be prevented.

Another object of the present invention is to provide a bicycle sprocket having a fastening part made of a synthetic resin in which the bicycle sprocket is configured to ensure that weight can be reduced, that rigidity can be maintained to prevent backlash, and that the sub-spike pins can be firmly fastened in place in a bicycle sprocket having a fastening part made of a synthetic resin.

The foregoing objects can basically be attained by providing a bicycle sprocket in accordance with a first aspect of the present invention that basically comprises a metallic sprocket ring part and a synthetic resin fastening part. The metallic sprocket ring part includes a ring element with a plurality of sprocket teeth located on an outer periphery of the ring element, a plurality of connecting elements located on an inner periphery of the ring element and a plurality of internal fastening elements located on radial inner ends of the connecting elements, respectively. The synthetic resin fastening part is non-movably formed on both axial faces of the sprocket ring part at a location radially inwardly of the sprocket teeth so as to cover at least a portion of the inner periphery of the ring element, the connecting elements, and the internal fastening elements.

In this sprocket, the easily deformable internal fastening elements are fastened by a bolt or another such fastening member to the ring element and the rotating drive unit around which the chain is wrapped and in which relative strength and abrasion resistance are important factors, and the internal fastening elements are made of metal with higher rigidity, strength, and abrasion resistance than a synthetic resin. Both sides of at least a portion of the inner periphery, the connecting elements, and the internal fastening elements are then covered with a relatively lightweight fastening part made of a synthetic resin. The internal fastening elements fastened to the rotating drive unit and the ring element in contact with the chain are made of metal to ensure strength, rigidity, and abrasion resistance, and the other fastening part is made of a synthetic resin to reinforce the internal fastening elements and to allow for weight reduction. Therefore, the weight of the sprocket is reduced, and loss of fastening force resulting from deterioration or deformation of the synthetic resin can be prevented.

According to a second aspect of the present invention, the bicycle sprocket according to the first aspect of the present invention is provided such that a plurality of the internal fastening elements are disposed at an interval from the ring element, and the connecting elements extend from the inner periphery of the ring element in a straight line along the radial direction towards the internal fastening elements. In this case, since a plurality of the internal fastening elements are provided separately and the internal fastening elements and the ring element are connected in straight lines in the radial direction by the connecting elements, then the fastening parts can be connected to the primary side of the ring element with the shortest possible distance. Therefore, the surface area of the metal internal fastening elements and the connecting elements can be reduced, and the weight of the sprocket can be further reduced.

According to a third aspect of the present invention, the bicycle sprocket according to the second aspect of the present invention is provided such that each of the internal fastening elements includes a fastener mounting hole, and a circumference element surrounding a corresponding one of the fastener mounting holes that is linked to a corresponding one of the connecting elements. In this case, the internal fastening elements are not likely to deform or deteriorate even if the mounting holes are used to firmly fasten the rotating drive unit in place with bolts, nuts, or other such fastening members, and the internal fastening elements merely surround the circumferences of the mounting holes. Therefore, the surface area of the internal fastening elements can be reduced, and the weight of the sprocket can be further reduced.

According to a fourth aspect of the present invention, the bicycle sprocket according to anyone of the first to third aspects of the present invention is provided such that the ring element further includes a plurality of spike fastening structures configured to fasten spike pins for guiding the chain over the sprocket teeth. In this case, since spikes are fastened on the metal ring element, the chain can be shifted smoothly and the spikes can be firmly fastened in place.

According to a fifth aspect of the present invention, the bicycle sprocket according to the fourth aspect of the present invention is provided such that the ring element further includes a plurality of sub-spike fastening structures integrally formed with the ring element and configured to fasten sub-spike pins at circumferentially spaced intervals of the ring element such that the sub-spike fastening structures are designed to guide the chain over the spikes. In this case, the chain can be shifted even more smoothly because the sub-spikes can be fastened in place as well as the spikes. The sub-spikes can be firmly fastened in place even if the sub-spikes are disposed on the internal peripheral sides of the spikes, because the sub-spike fastening structures are integrally formed on the metallic ring element and not provided to the fastening part made of a synthetic resin.

According to a sixth aspect of the present invention, the bicycle sprocket according to anyone of the first to fifth aspects of the present invention is provided such that the sprocket ring part is a press punched metal plate in which the ring element, the connecting elements and the internal fastening elements are an integral one-piece, unitary ring shape member. In this case, the steps of manufacturing the sprocket ring part are simplified.

According to a seventh aspect of the present invention, a bicycle sprocket is provided that is mounted on the rotating drive unit of a bicycle and that has a bicycle-driving chain wrapped around the external periphery. The bicycle sprocket of this seventh aspect basically comprises a metallic sprocket ring part and a synthetic resin fastening part. The metallic sprocket ring part includes a ring element with a plurality of sprocket teeth located on an outer periphery of the ring element, a plurality of spike fastening structures configured to fasten spike pins on the ring element, and a plurality of sub-spike fastening structures integrally formed with the ring element on an inner periphery of the ring element and configured to fasten sub-spike pins at circumferentially spaced intervals along of the inner periphery of the ring element. The synthetic resin fastening part is non-movably formed on both axial faces of the sprocket ring part at a location radially inwardly of the sprocket teeth so as to cover at least the inner periphery of the ring element and the sub-spike fastening structures.

In this case, the spikes, the sub-spikes, and the ring element on which the sprocket teeth meshing with the chain are formed are made of metal in which strength can be maintained, and the fastening part fastened to the rotating drive unit is made of a lightweight synthetic resin. The fastening part is integrally formed on both sides of the sprocket ring part on the internal peripheral side of the section where the sprocket teeth are formed. Since the sprocket ring part and the fastening part are fastened in place by fastening the fastening part to both sides of the sprocket ring part by, for example, insert molding, outsert molding, or another such method of integral molding, backlash can be prevented and high rigidity between the sprocket ring part and the fastening part can be maintained. Also, the sprocket can be made lightweight because the fastening part is made of a synthetic resin. Furthermore, the chain can be shifted even more smoothly because the sub-spikes can be fastened in place as well as the spikes. The sub-spikes can be firmly fastened in place even if the sub-spikes are disposed on the internal peripheral sides of the spikes, because the sub-spike fastening structures are integrally formed on the metallic ring element and not provided to the fastening part made of a synthetic resin.

According to an eighth aspect of the present invention, the bicycle sprocket according to the seventh aspect of the present invention is provided such that a plurality of metallic cylindrical members mounted in a plurality of fastener mounting holes formed in the fastening part, the cylindrical members having contact surfaces configured and arranged to bear a tightening force from a corresponding one of a plurality of fastening members that are received in the fastener mounting holes. In this sprocket, the fastening part connected to the sprocket ring and fastened to the rotating drive unit is made of a lightweight synthetic resin. The mounting holes are provided to the fastening part, and the metallic cylindrical members are mounted in the mounting holes. Bolts or other such fastening members, for example, are inserted into the cylindrical members to fasten the sprocket to the rotating drive unit. At this time, the contact surfaces of the cylindrical members bear the force from the fastening members instead of the fastening part. Since the cylindrical members mounted on the fastening part are made of a metal that does not deteriorate over time as fast as a synthetic resin, and the contact surfaces of the cylindrical parts bear the force form the fastening members, a sufficient fastening force can be maintained and the sections where the rotating drive unit is fastened are not likely to deform even if the fastening part is made of a soft synthetic resin to reduce weight. Therefore, loss of fastening force resulting from deterioration or deformation of the synthetic resin can be prevented, and the sprocket can be made to be lightweight.

According to a ninth aspect of the present invention, the bicycle sprocket according to the seventh or eighth aspect of the present invention is provided such that the sprocket ring part is a press punched metal plate in which the ring element, the spike fastening structures and the sub-spike fastening structures are an integral one-piece, unitary ring shape member. Also, since the fastening part extending out to the inner side does not need to be integrally formed, a small sprocket can be simultaneously formed on the inner side of the section of the metal plate where the sprocket ring part is formed.

According to a tenth aspect of the present invention, the bicycle sprocket according to anyone of the first to ninth aspects of the present invention is provided such that the sprocket ring part further includes an anchor structure configured to connect the fastening part in a non-rotatable manner to the sprocket ring part. In this case, rigidity is further increased because the sprocket ring part and the internal fastening elements are connected in a non-rotatable manner by the anchor structure.

According to an eleventh aspect of the present invention, the bicycle sprocket according to the tenth aspect of the present invention is provided such that the anchor structure comprises a plurality of through-holes formed at circumferentially spaced apart intervals in a circumferential direction of the ring element. In this case, the fastening part is firmly connected to the ring element because the fastening part is formed by passing through multiple through-holes.

According to a twelfth aspect of the present invention, the bicycle sprocket according to anyone of the first to eighth aspects of the present invention is provided such that the fastening part comprises a carbon fiber-containing resin obtained by impregnating a polyamide-based synthetic resin with carbon fiber filler. In this case, the strength of the fastening part can be increased to be greater than when only a synthetic resin is used that is mounted on the rotating drive unit of a as a result of impregnation with carbon fiber.

According to a thirteenth aspect of the present invention, the bicycle sprocket according to anyone of the first to ninth aspects of the present invention is provided such that the sprocket ring part is made of an aluminum alloy with an anodic oxide coating formed on the surface. In this case, the corrosion resistance of the sprocket ring part is improved.

According to the present invention, the ring element in contact with the chain and the internal fastening elements fastened to the rotating drive unit are made of metal to ensure strength, rigidity, and abrasion resistance, and the other fastening part is made of a synthetic resin to reinforce the internal fastening elements and to allow for weight reduction. Therefore, the weight of the sprocket is reduced, and loss of fastening force resulting from deterioration or deformation of the synthetic resin can be prevented.

According to the other inventions, since the sprocket ring part and the fastening part are fastened in place by integrally molding the fastening part to both sides of the sprocket ring part, backlash can be prevented and high rigidity between the sprocket ring part and the fastening part can be maintained. Also, the sprocket can be made lightweight because the fastening part is made of a synthetic resin. Furthermore, the chain can be shifted even more smoothly because the sub-spikes can be fastened in place in addition to the spikes. The sub-spikes can be firmly fastened in place even if the sub-spikes are disposed on the internal peripheral sides of the spikes, because the sub-spike fastening structures are integrally formed on the metallic ring element and not provided to the fastening part made of a synthetic resin.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
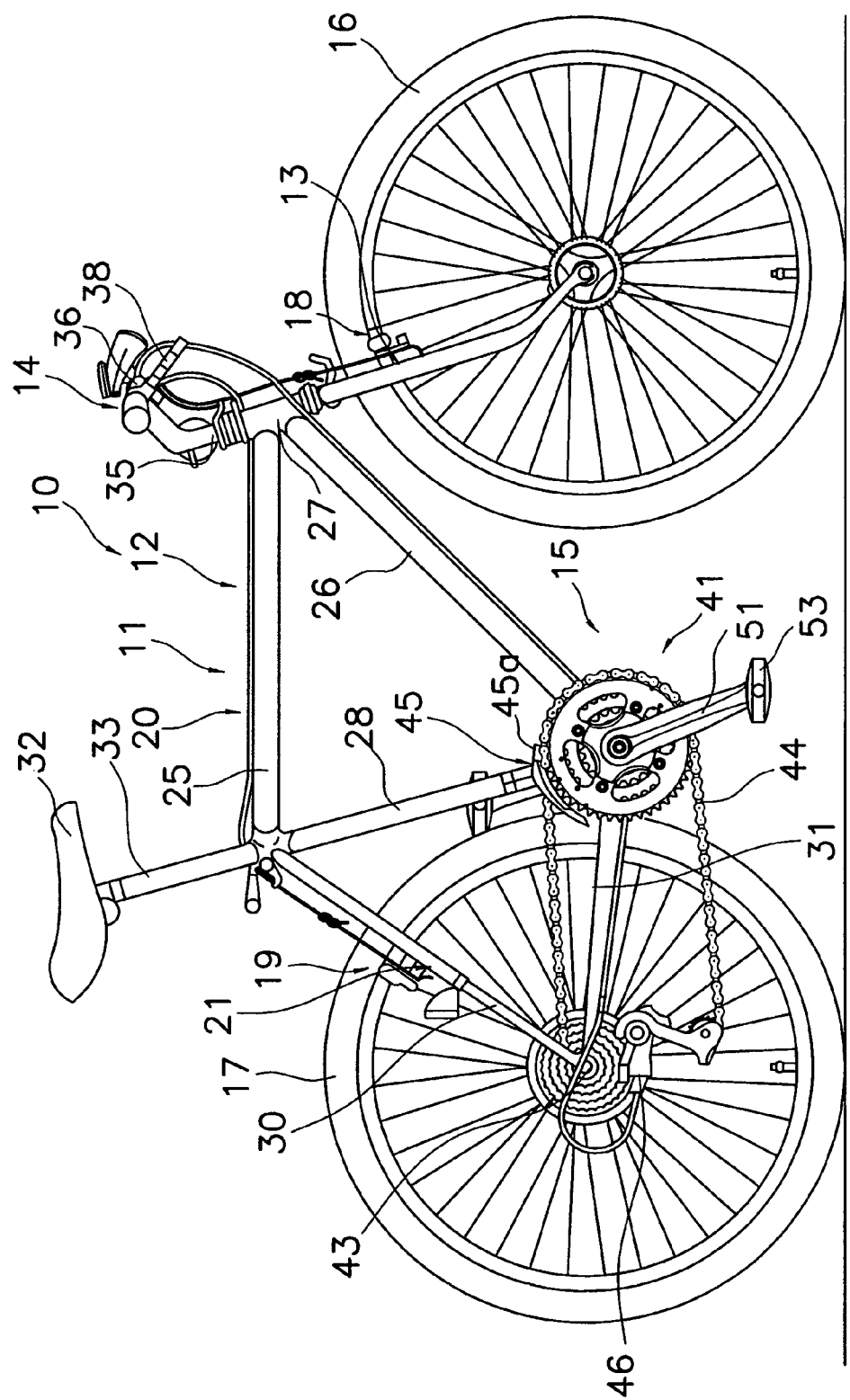
FIG. 1 is a side elevational view of a bicycle having a front crankset with a bicycle sprocket in accordance with a first embodiment of the present invention.

Referring initially to FIG. 1, a bicycle 10 is illustrated that can be used with each embodiment of the present invention. The bicycle 10 is equipped in accordance with a first embodiment of the present invention. While the bicycle 10 is illustrated as a mountain bike, it will be apparent to those skilled in the art from this disclosure that the present invention can be applied to other types of bicycles such as a road bike. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The bicycle 10 has a diamond-style frame 11 constituting the structure of the bicycle 10. The frame 11 has a frame body 12 and a front fork 13 that is rotatably supported about a longitudinal axle inclined towards a front end of the frame body 12. The front fork 13 divides in two wheel attachment portions at its bottom end. The bicycle 10 also comprises a flat style handlebar unit 14, a drive unit 15, a front wheel 16, a rear wheel 17, a front braking device 18 and a back braking device 19. The handlebar unit 14 is connected to an upper end of the front fork 13 in a conventional manner. The drive unit 15 is mounted at the bottom of the frame body 12 for converting pedal force into drive force. The front wheel 16 is rotatably supported at the lower end of the front fork 13. The rear wheel 17 is rotatably supported at the rear of the frame body 12, and front and back braking devices 18 and 19.

The frame body 12 has a front triangle 20 and a rear triangle 21 disposed behind the front triangle 20. The frame 11 is basically formed by a top tube 25, a down tube 26, a head tube 27, a seat tube 28, a cylindrical hanger tube 29, a pair of seat stays 30 and a pair of chain stays 31. The tubes 25 to 29 basically form the front triangle 20, while the tubes 28 to 31 form the rear triangle 21. Thus, the seat tube 28 and the hanger tube 29 form part of both the front and rear triangles 20 and 21.

The top tube 25 is arranged generally horizontally, while the down tube 26 is arranged below the top tube 25 such that it slants obliquely downward toward the rear of the bicycle 10. The head tube 27 joins the front ends of the top tube 25 and the down tube 26 together. The seat tube 28 extends diagonally upward and joins the rear ends of the top tube 25 and the down tube 26 together with the cylindrical hanger tube 29 (FIG. 3) disposed between the seat tube 28 and the down tube 26.

The seat tube 28 has a seat post 33 with a saddle 32 fastened thereon. The seat post 33 is secured to the seat tube 28 in such a manner that its position can be adjusted up and down. The rear triangle 21 is configured from a pair of seat stays 30 that are joined at the front ends to the seat tube 28 and that extend downward at an incline as two separate prongs, and a pair of chain stays 31 that extend as two separate prongs backwards from the bottom end of the seat tube 28 and that are joined to the back ends of the seat stays 30.

A handlebar stem 35 constituting a part of the handlebar unit 14 is fastened to the top of the front fork 13 in such a manner that it can be adjusted up and down. A handlebar 36 that extends to the left and right is fastened to the top end of the handlebar stem 35. Each end of the handlebar 36 is provided with a brake lever 38 (only one shown) with gear-shifting functions.

The drive unit 15 basically has a front crankset or unit 41, a rear sprocket assembly or small rear gear unit 43, a chain 44, a front derailleur 45 and a rear derailleur 46. The front crankset (crank unit) 41 is mounted on the hanger tube 29. The rear sprocket assembly (small gear unit) 43 is mounted in a non-rotatable manner to the free hub or free wheel of the rear wheel 17. The chain 44 is arranged on the crankset (gear crank unit) 41 and the rear sprocket assembly (small gear unit) 43 so as to extend therebetween. The front derailleur 45 is coupled to the seat tube 28, while the rear derailleur 46 is coupled to the rear triangle 21. The derailleurs 45 and 46 function as devices for shifting or changing gears. The front derailleur 45 has a chain guide 45a through which the chain 44 passes.

Figure 2:
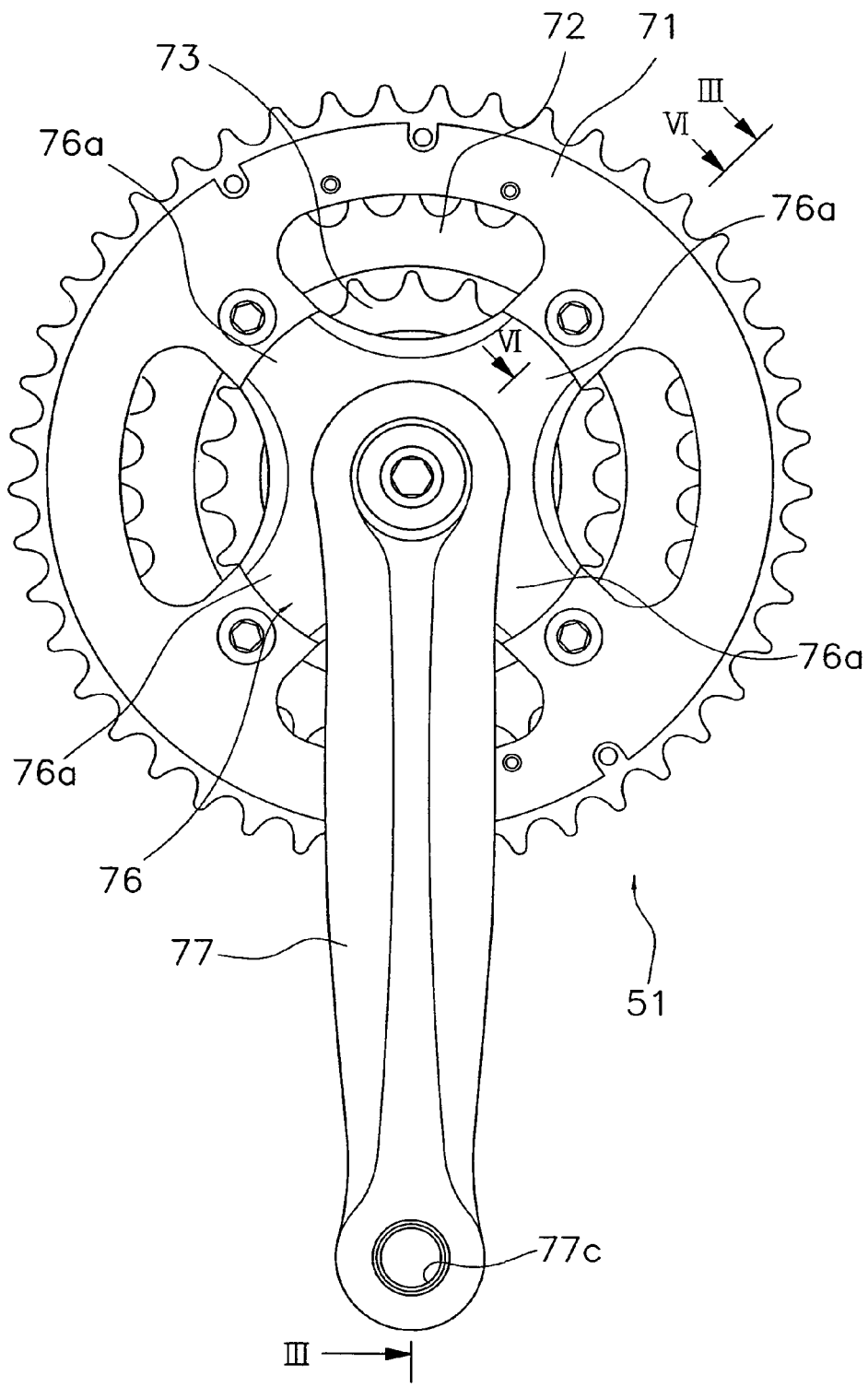
FIG. 2 is an enlarged side elevational view of the front crankset of the bicycle illustrated in FIG. 1 in accordance with the first embodiment of the present invention.
Figure 3:
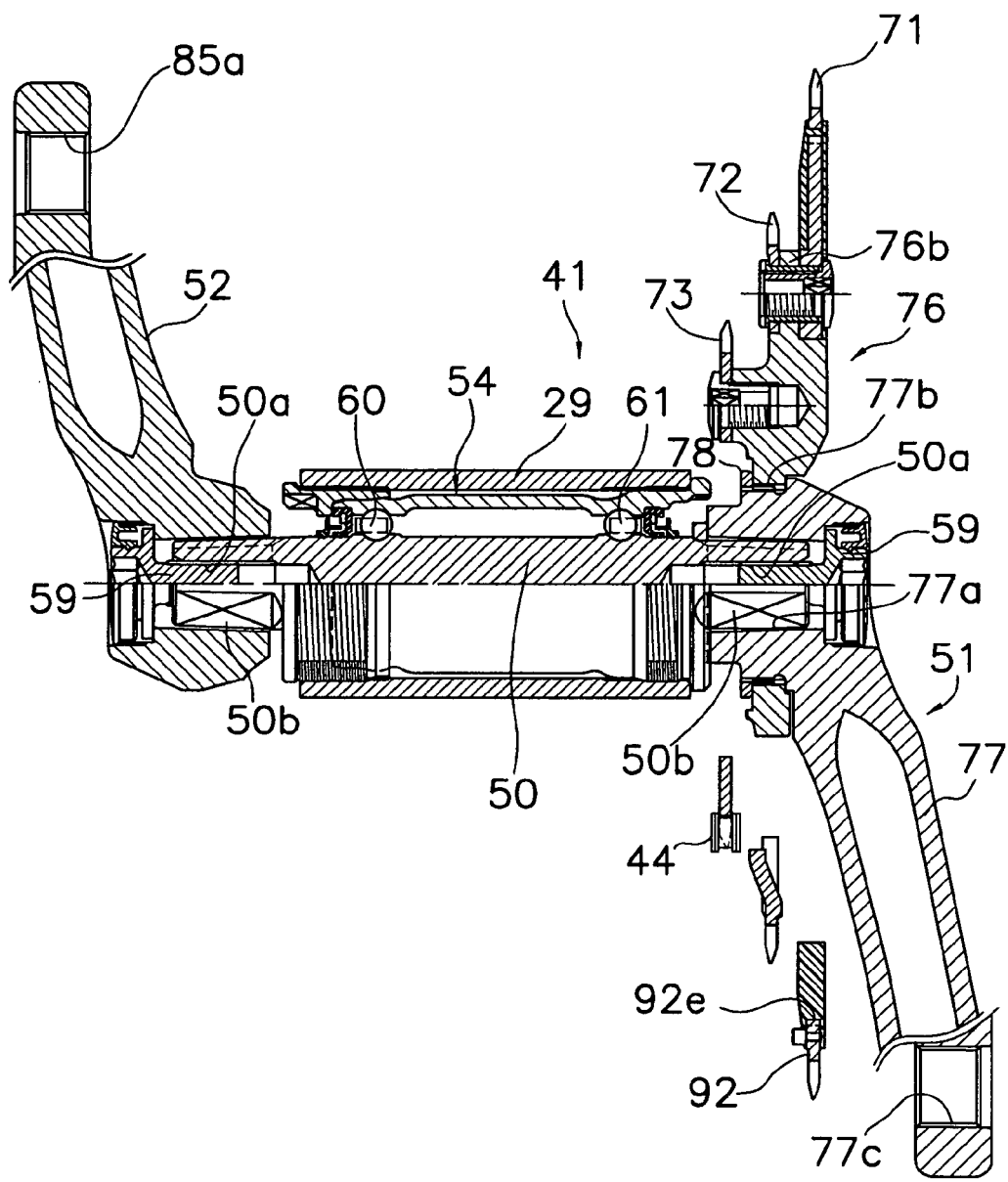
FIG. 3 is a cross sectional view of the front crankset illustrated in FIGS. 1 and 2, as seen along section line III-III in FIG. 2, in accordance with the first embodiment of the present invention.
Figure 4:
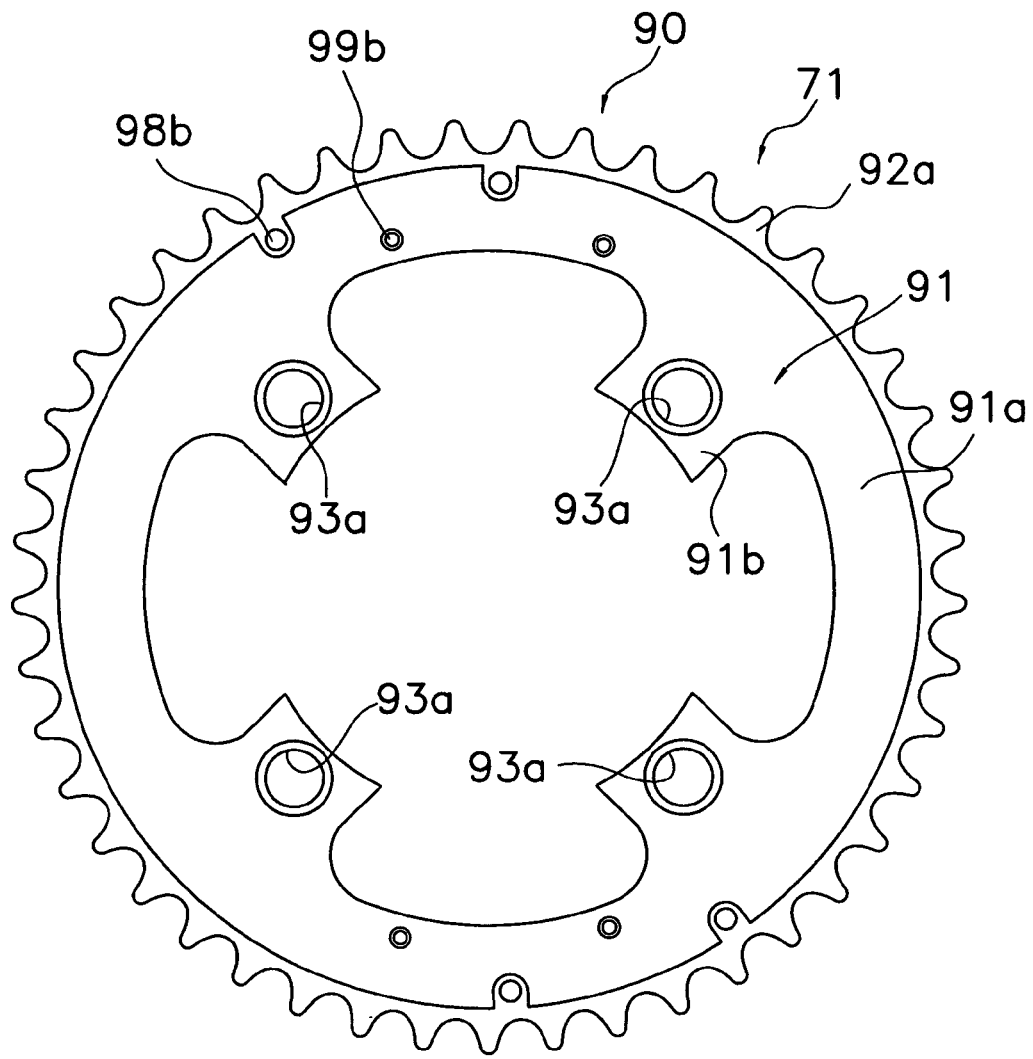
FIG. 4 is an outside elevational view of the large bicycle sprocket of the front crankset illustrated in FIGS. 1-3 in accordance with the first embodiment of the present invention, with the other parts of the crankset removed for the purpose of illustration.

As shown in FIGS. 1 through 3, the crank assembly (crank unit) 41 basically includes a crankshaft 50 (FIG. 3), a right crankset (gear crank) 51 and a left crank arm (left crank) 52. The crankshaft 50 is supported in a freely rotatable manner in the hanger tube 29 of the frame 11. The right crankset 51 has an inner end fastened onto the right end of the crankshaft 50 by crimping and an outer or distal end with a pedal 53 (FIG. 1) mounted thereto. The left crank arm 52 (FIG. 3) is fastened in a detachable manner to the left end of the crankshaft 50 with another pedal (that is a mirror image of the pedal 53) mounted to its tip end such that the rider can provide a pedaling force to the drive train 15, as best seen in FIG. 1.

As shown in FIG. 3, the crankshaft 50 is mounted in a freely rotatable manner in the hanger tube 29 by a bottom bracket 54 mounted in the hanger tube 29. The crankshaft 50 is, for example, preferably a hollow pipe-shaped member made of a high-rigidity alloy, such as chrome-molybdenum steel or another highly rigid alloy. Each end of the crankshaft 50 has a blind bore with internal threads 50a that threadedly receives a fastening bolt 59 to fasten the crankset 51 and the crank arm 52 onto the ends of the crankshaft 50. Each end of the crankshaft 50 also has a rectangular tapered outer surface 50b for non-rotatably interlocking the crankset 51 and the crank arm 52 onto the outer peripheral surfaces of the crankshaft 50.

The bottom bracket 54 has a pair of bearing arrangements 60 and 61 disposed in the interior of the hanger tube 29 so that the crankshaft 50 is rotatably supported in the hanger tube 29 by the bearing arrangements 60 and 61.

As shown in FIGS. 2 and 3, the right crankset (gear crank) 51 includes three chainrings or sprockets 71-73, for example, a sprocket mounting unit 76 and a main right crank arm part 77. The sprockets 71-73 are disposed to be aligned in the axial direction so that the number of teeth increases inward in the axial direction. The sprockets 71-73 are mounted to the right crankset 51 by the sprocket mounting unit 76, which is an example of a rotating drive unit. The sprocket mounting unit 76 has four crank connecting arms 76a extending in a radial pattern to fasten the three sprockets 71-73 in place. The sprocket mounting unit 76 is non-rotatably fastened on the external periphery of an inner proximal end of the main right crank arm part 77 by a lock ring 78.

Figure 6:
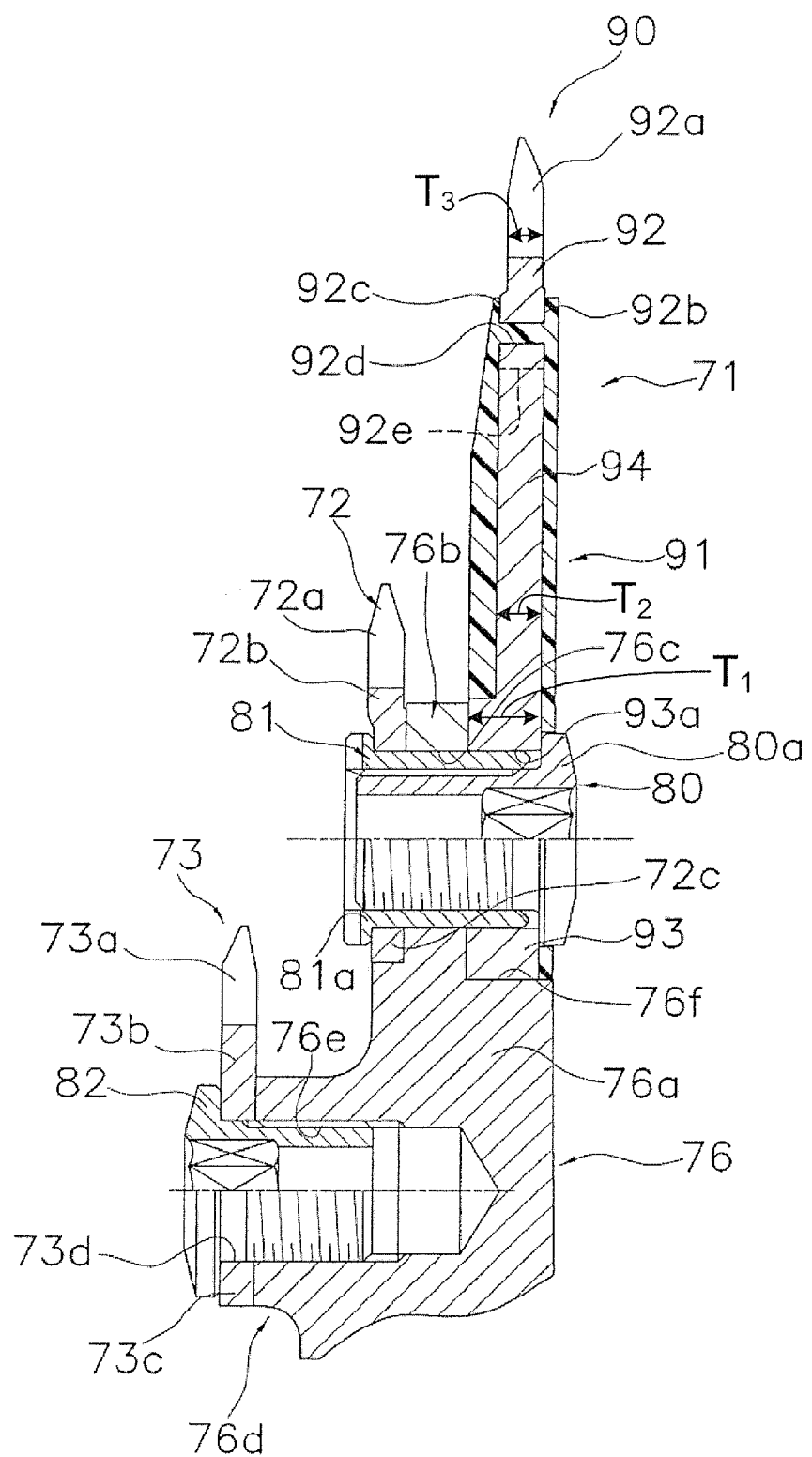
FIG. 6 is an enlarged, partial cross sectional view of the front crankset illustrated in FIG. 2, as seen along section line VI-VI in FIG. 4 in accordance with the first embodiment of the present invention.

Each of the crank connecting arms 76a of the sprocket mounting unit 76 has a first mounting portion 76b for mounting the sprockets 71 and 72 concentrically to the crankshaft 50. The first mounting portions 76b are formed on both sides at the distal ends of the arms 76a to form a concavity in relation to the other portions. In other words, the first mounting portions 76b are recessed on opposite axial sides thereof relative to the other portions to form outwardly facing abutment surfaces. As shown in FIG. 6, a fastening hole 76c is formed in each of the first mounting portions 76b for collectively fastening the sprockets 71 and 72 by a cylindrical chainring nut 81 that has a head 81a and a chainring bolt 80 that has a head 80a. The chainring nuts 81 are threaded over the chainring bolts 80. Thus, the sprockets 71 and 72 can be fastened simultaneously to the first mounting portions 76b with the (four) chainring bolts 80 and the (four) chainring nuts 81.

Each of the crank connecting arms 76a of the sprocket mounting unit 76 also has a second mounting portion 76d for fastening the sprocket 73 with a bolt 82. The second mounting portions 76d are formed to protrude inward on the inner sides at the middle portion of the crank connecting arms 76a (on the left side in FIG. 6). The second mounting portions 76d are each provided with a screw hole 76e through which the bolts 82 are screwed.

As shown in FIG. 3, the right main crank arm part 77 has a rectangular tapered axle mounting hole 77a that is formed at its inner or proximal end. The crankshaft 50 is non-rotatably mounted in the rectangular tapered axle mounting hole 77a. The right main crank arm part 77 also has a plurality of serrations 77b formed on the external periphery at its inner or proximal end. The serrations 77b non-rotatably fasten the sprocket mounting unit 76 on the external periphery at the inner or proximal end of the right main crank arm part 77.

The main right crank arm part 77 extends outward in the radial direction from the inner or proximal end to the outer or distal end while slanting slightly outward in the axial direction. A threaded pedal mounting hole 77c is provided in the extended tip end of the right main crank arm part 77 for installing the pedal 53 at the outer or distal end of the main right crank arm part 77.

As shown in FIGS. 4 through 8, the sprocket 71 basically comprises a metallic sprocket ring part 90 and a synthetic resin fastening part 91 that is integrally molded with the sprocket ring part 90 by, for example, insert molding or outsert molding.

Figure 7:
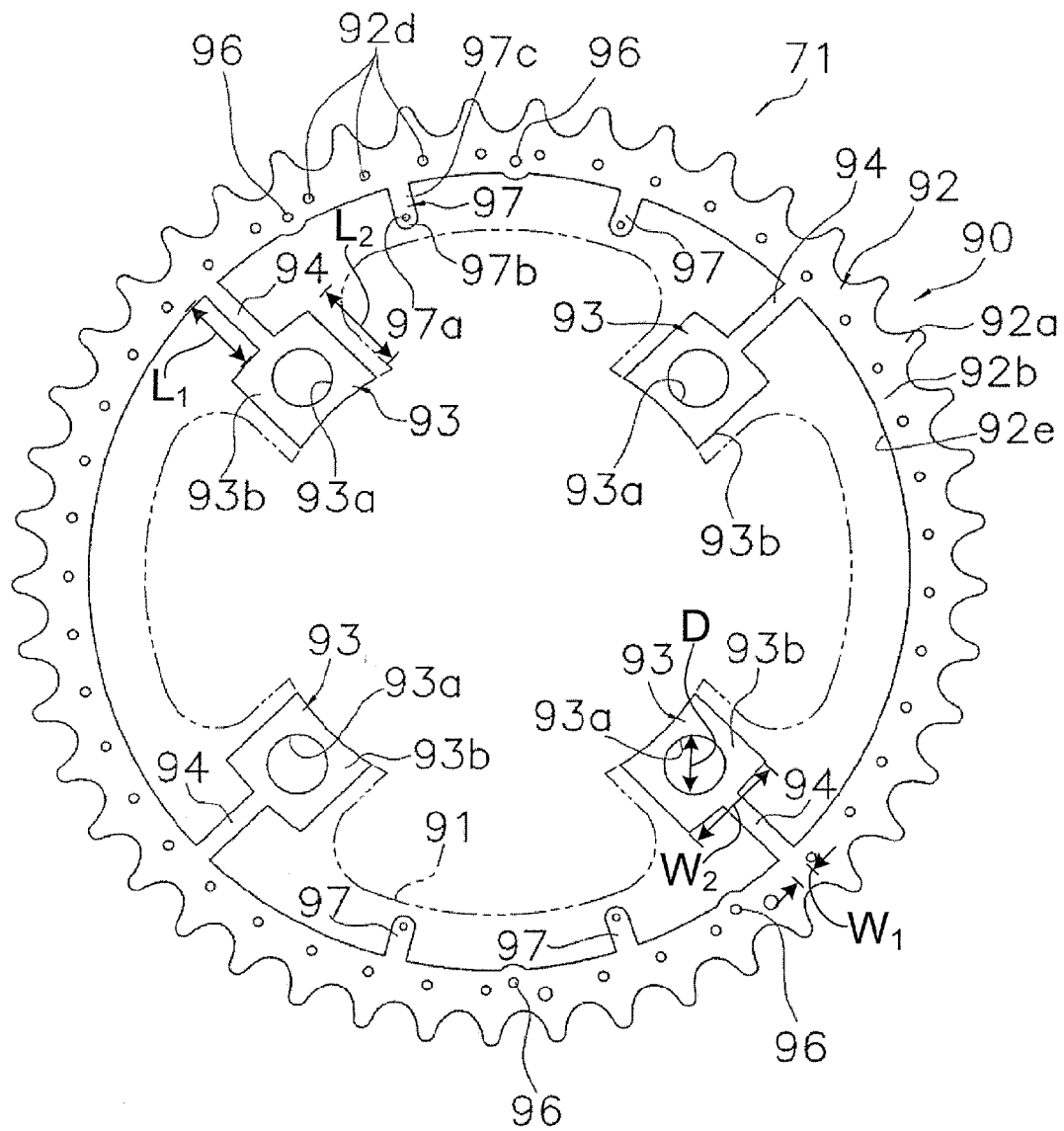
FIG. 7 is an outside elevational view of the sprocket ring part of the large bicycle sprocket for the front crankset illustrated in FIGS. 1-3 in accordance with the first embodiment of the present invention.

The sprocket ring part 90 is a metallic ring shaped member made of, for example, an aluminum alloy with an anodic oxide coating formed on the surface. The sprocket ring part 90 basically includes a ring element 92, a plurality of internal fastening elements 93 and a plurality of connecting elements 94. The ring element 92 has a plurality of sprocket teeth 92a located on an outer periphery of the ring element 92 for selectively receiving the chain 44. The connecting elements 94 are located on an inner periphery of the ring element 92 with the internal fastening elements 93 being located on radial inner ends of the connecting elements 94. The connecting elements 94 have a width $W_1$ measured in the circumferential direction of the sprocket ring part 90 and a radial length $L_1$ measured in the radial direction of the sprocket ring part 90. as shown in FIG. 7. Thus, the connecting elements 94 are configured and arranged to connect the internal fastening elements 93 to the ring element 92, as shown in FIG. 7. The sprocket ring part 90 further has a plurality of spike fastening structures (holes) 96 formed on the ring element 92 for fastening spike pins 98 to guide the chain 44 onto the sprocket teeth 92a. The sprocket ring part 90 further has a plurality of sub-spike fastening structures (holes) 97 disposed at intervals from the internal peripheral side of the ring element 92. The sub-spike fastening structures (holes) 97 are formed integrally with the ring element 92 for fastening sub-spike pins 99 to guide the chain 44 over the spike pins 98.

As shown in FIGS. 6 and 7, The ring element 92 has a plurality of through-holes 92d formed at circumferentially spaced intervals in the circumferential direction of the ring element 92. These through-holes 92d act as anchor structures for facilitating the non-rotatable connection of the fastening part 91. The internal fastening elements 93 and the connecting elements 94 are formed integrally with the ring element 92. The same number of internal fastening elements 93 as the arms 76a (for example, four) are disposed along the circumferential direction at intervals from the ring element 92. Each of the internal fastening elements 93 has a mounting hole 93a defined by a peripheral portion 93b. The mounting holes 93a each receive one of the bolts 80 and one of the nuts 81 to fasten the sprocket 71 to the first mounting portions 76b of the crank connecting arms 76a of the sprocket mounting unit 76.

The peripheral portions 93b surround the peripheries of the mounting holes 93a and are connected to the connecting elements 94. The internal fastening elements 93 are formed with the inner sides (the left side in FIG. 6) protruding past the ring element 92 and the connecting elements 94. Thus, the internal fastening elements 93 are thicker than the ring element 92 and the connecting elements 94. More specifically as shown in FIG. 6, internal fastening elements 93 have a thickness $T_1$, the connecting elements 94 have a thickness $T_2$ and the ring element 92 has a thickness $T_3$, with the thickness $T_1$ being greater than both the thicknesses $T_2$ and $T_3$ and the thickness $T_2$ being greater than the thickness $T_3$ ($T_1 > T_2 > T_3$). As shown in FIG. 7, the internal fastening elements 93 have a width $W_2$ measured in the circumferential direction of the sprocket ring part 90 and a radial length $L_2$ measured in the radial direction of the sprocket ring part 90. As indicated in FIG. 7, the radial length $L_2$ is greater than the radial length $L_1$ and the width $W_2$, is greater than the width $W_1$. The outer sides (the right side in FIG. 6) of the internal fastening elements 93 are in contact with the heads 80a of the bolts 80, while the inner sides are in contact with the outer sides of the first mounting portions 76b. Therefore, the fastening part 91 is formed in this section so as to expose the internal fastening elements 93. The mounting holes 93a have a diameter D that is substantially the same diameter as the fastening holes 76c formed in the first mounting portions 76b. Thus, the mounting holes 93a are disposed to allow communication with the fastening holes 76c. In this embodiment, the peripheral portions 93b have a mostly rectangular shape in which the inner sides and the outer sides form an arcuate shape and both sides are formed in a straight line. The internal peripheries of the peripheral portions 93b are in contact with the stepped portions 76f formed in the first mounting portions 76b. Thus, the internal peripheries of the peripheral portions 93b are formed so as to support the internal periphery of the sprocket 71. The connecting elements 94 extend in a straight light from the internal periphery of the ring element 92 to the middles of the peripheral portions 93b in the radial direction over a width less than the length (width) of the peripheral portions 93b in the circumferential direction.

Figure 5:
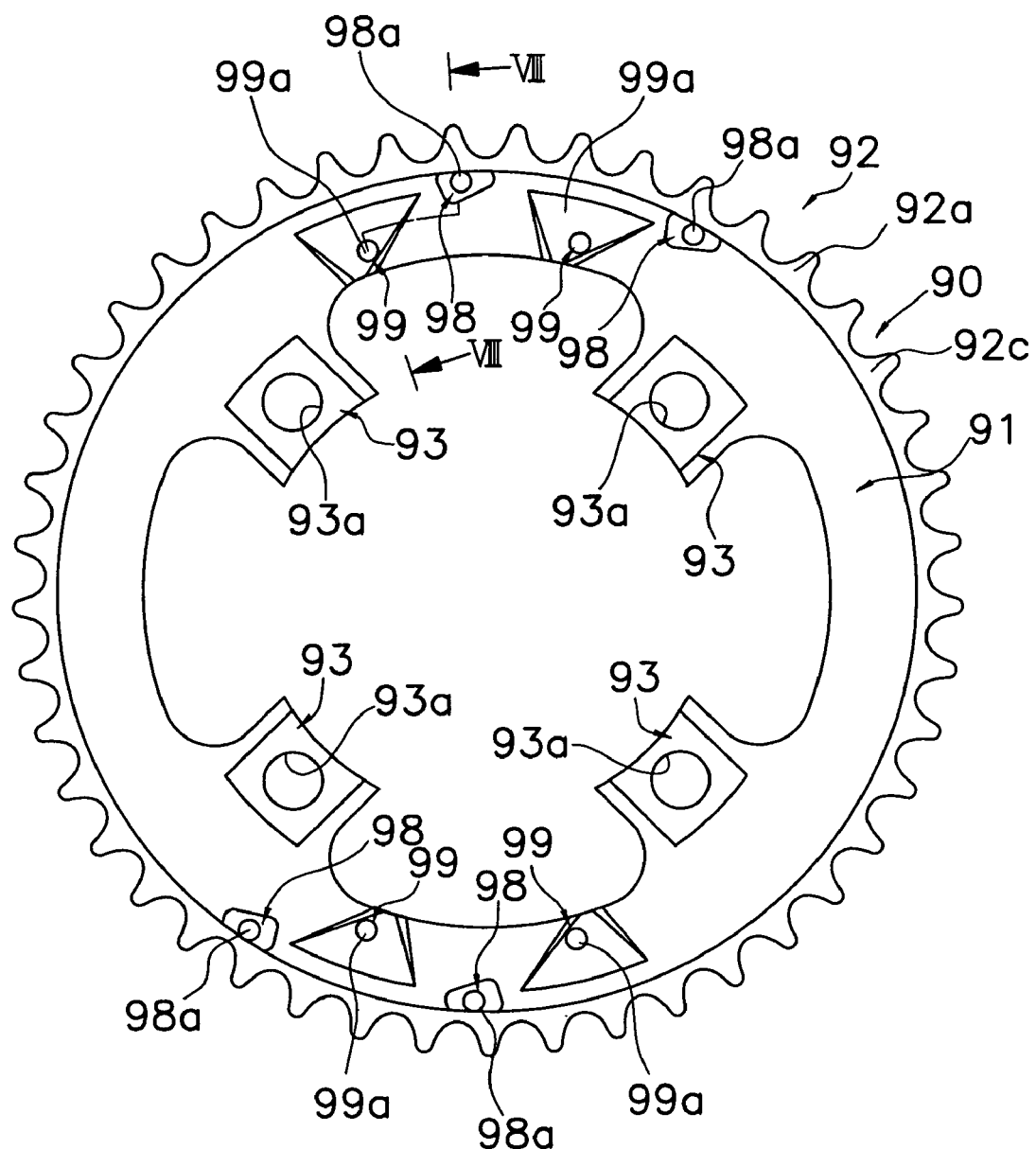
FIG. 5 is an inside elevational view of the large bicycle sprocket illustrated in FIG. 4 in accordance with the first embodiment of the present invention.
Figure 8:
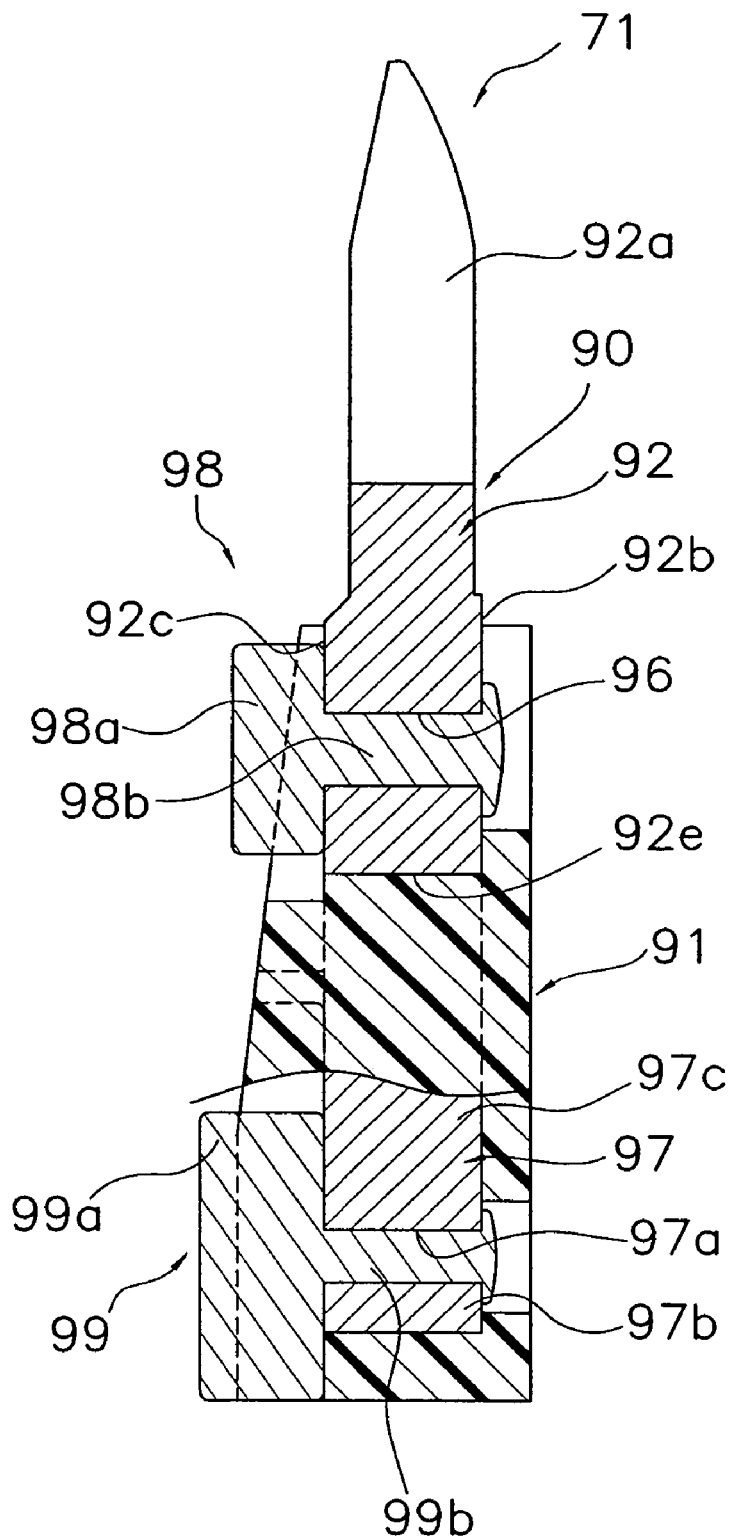
FIG. 8 is a cross-sectional view of the large bicycle sprocket as seen along section line VIII-VIII in FIG. 5 in accordance with the first embodiment of the present invention.

The spike fastening structures 96 are configured from through-holes formed slightly farther inward than the through-holes 92d. In this embodiment, two through-holes that are spaced apart by four of the sprocket teeth 92a constitute a pair of the spike fastening structures 96. Thus, the spike fastening structures 96 are arranged to form two pairs of the spike fastening structures 96. Each of the spike pins 98 has a guiding part 98a and an axle 98b. The guiding parts 98a protrude towards the internal lateral side surface 92c of the ring element 92 for guiding the chain 44. The axles 98b pass through the spike fastening structures 96 and protrude to the external lateral side face 92b. The protruding parts of the axles 98b are crimped (deformed) against the external lateral side face 92b of the ring element 92 to fasten the spike pins 98 to the ring element 92, as shown in FIGS. 5 and 8.

Each of the sub-spike fastening structures 97 has a through-hole 97a formed in a fastening portion 97b, and connecting portions 97c for connecting the fastening portions 97b to the internal periphery of the ring element 92. The fastening portions 97b are disposed at intervals from the internal peripheral side of the ring element 92. These connecting portions 97c are formed so as to extend in the radial direction. The sub-spike fastening structures 97 are disposed downstream of the spike fastening structures 96 in the rotating direction of the sprocket 71 (clockwise in FIG. 7). The sub-spike fastening structures 97 are disposed in double pairs similar to the spike fastening structures 96, such that two sub-spike fastening structures 97 constitute one pair, for example. The sub-spike fastening structures 97 are disposed at an interval equivalent to two of the sprocket teeth 92a from the spike fastening structures 96. Each of the sub-spike pins 99 has a guiding part 99a and an axle 99b. The guiding parts 99a protrude towards the internal lateral side face 92c of the ring element 92 for guiding the chain 44. The axles 99b pass through the sub-spike fastening structures 97 and protrude towards the external lateral side face 92b, as shown in FIGS. 5 and 8. The protruding parts of the axles 99b are crimped (deformed) against the external lateral side face 92b of the ring element 92 to fasten the sub-spike pins 99 to the ring element 92.

In the sprocket ring part 90, the sprocket teeth 92a are formed in the external or outer periphery and the through-holes 92d are formed in both lateral side faces 92b and 92c by press punching a metal plate into a ring shape so that the internal fastening elements 93, the connecting elements 94, and the sub-spike fastening structures 97 are all formed in the internal peripheral side.

The fastening part 91 is, for example, made of a polyamide-based synthetic resin impregnated with a filler made of carbon fiber. The fastening part 91 is integrally formed on both sides of the sprocket ring part 90 so as to cover at least a portion of the connecting elements 94, the internal fastening elements 93 and the peripheral portion of the ring element 92 located inward in relation to the sprocket teeth 92a.

The fastening part 91 includes a circular cover section 91a and a plurality of internal cover sections 91b. The circular cover section 91a is integrally formed to overlie the ring element 92, the connecting elements 94 and the sub-spike fastening structures 97. Thus, the circular cover section 91a is integrally formed to cover the internal peripheral edge 92e and the lateral side faces 92b and 92c of the ring element 92 (FIG. 3). The internal cover sections 91b are integrally formed to cover one of the axially facing side surfaces of the internal fastening elements 93 as well as both side edges of the internal fastening elements 93 in the direction of rotation. Thus, the internal cover sections 91b extend radially inward from the circular cover section 91a, with the internal cover sections 91b integrally formed with the circular cover section 91a to overlie the internal fastening elements 93.

In this embodiment, as seen in FIG. 8, the internal lateral side face 92c of the ring element 92 is not covered by the circular cover section 91a in the sections where the spike pins 98 and the sub-spike pins 99 are mounted. Also, the external lateral side face 92b of the ring element 92 is not covered by the circular cover section 91a in the sections where the axles 98b and 99b are crimped to the spike fastening structures 96 and the sub-spike fastening structures 97. As seen in FIG. 8, the surfaces of the internal fastening elements 93 that face in the axial direction towards the center of the bicycle 10 are also not covered by the internal cover section 91b. The portions of the surfaces of the internal fastening elements 93 that face in the axial direction away the center of the bicycle 10 and that are slightly larger than the heads 80a are also not covered by the internal cover section 91b. In other words, the areas of the surfaces of the internal fastening elements 93 surrounding the mounting holes 93a of the internal fastening elements 93 are not covered by the internal cover section 91b.

The sprocket 71 with this configuration is manufactured by the following steps. First, an aluminum plate is subjected to press punching to obtain the sprocket ring part 90 with a shape such as shown in FIG. 7. Then, a circular diffusion layer is formed on the lateral side faces 92b and 92c and the internal peripheral edge 92e of the sprocket ring part 90. The circular diffusion layer is formed by using a fine powder of triazine thiol that is diffused by electrodeposition plating. Next, the sprocket ring part 90 on which the diffusion layer is formed is inserted into a metal mold having an upper mold and a lower mold for molding the fastening part 91. Spaces for forming the circular cover section 91a and the internal cover section 91b of the fastening part 91 are formed inside the metal mold. Also, the metal molds are formed in contact with the sprocket ring part 90 so as to expose the metallic portions in the peripheries of the mounting holes 93a, the inner surfaces of the internal fastening elements 93, and the sections where the spike pins 98 and the sub-spike pins 99 are mounted. The same also applies to the portions where the axles 98b and 99b are crimped in the spike fastening structures 96 and the sub-spike fastening structures 97. When the sprocket ring part 90 is mounted, the metal molds are closed up. Then, the spaces inside of the molds are filled with a melt of a polyamide-based synthetic resin impregnated with a filler made of carbon fiber. The synthetic resin chemically reacts with the diffusion layer to chemically bond the fastening part 91 and the sprocket ring part 90. The sprocket 71 having a fastening part 91 integrally formed on the sprocket ring part 90 is thus completed by such insert molding.

The ring element 92 in contact with the chain 44 and the internal fastening elements 93 fastened to the first mounting portions 76b are made of metal to ensure strength, rigidity, and abrasion resistance, and in addition, the fastening part 91 is made from a synthetic resin to reinforce the internal fastening elements 93 and to reduce weight. Therefore, the sprocket 71 can be made lightweight, and it is possible to prevent loss in fastening force resulting form deterioration or deformation of the synthetic resin.

Also, since the sprocket ring part 90 and the fastening part 91 are fastened together by integrally forming the fastening part on both sides of the sprocket ring part 90, backlash can be prevented, and high rigidity can be maintained between the sprocket ring part 90 and the fastening part 91. Furthermore, the chain 44 can be shifted even more smoothly because the sub-spike pins 99 can be fastened in place in addition to the spike pins 98. The sub-spike pins 99 can be firmly fastened in place even if the sub-spike pins 99 are disposed on the internal peripheral sides of the spike pins 98, because the sub-spike fastening structures 97 are integrally formed on the metallic ring element 92 and not provided to the fastening part 91 made of a synthetic resin.

The sprocket 72 is a conventional sprocket made from an aluminum alloy, for example, wherein a ring part 72b on which sprocket teeth 72a are formed is integrally formed with a fastening part 72c that protrudes radially inward from the internal periphery of the ring part 72b and that has a mounting hole 72d, as shown in FIG. 6. The fastening part 72c and the internal fastening elements 93 are collectively fastened in place on the first mounting portions 76b of the arms 76a by the bolts 80 and the nuts 81.

The sprocket 73 is a conventional sprocket made from an aluminum alloy, for example, wherein a ring part 73b on which sprocket teeth 73a are formed is integrally formed with a fastening part 73c that protrudes radially inward from the internal periphery of the ring part 73b and that has a mounting hole 73d. The fastening part 73c is fastened in place on the second mounting portions 76d of the arms 76a by the bolts 82.

The left crank arm 52 is an arm-shaped member in which a pedal mounting hole 85a is formed for the pedal 53 to be threaded into the distal end, as shown in FIG. 3.

When the crank unit 41 configured in this manner is mounted on the bottom bracket 54, the sprockets 71-73 are first mounted on the gear crank or crankset 51. When the sprockets 71 and 72 are mounted on the crankset 51, the sprockets 71 and 72 are placed on both sides of the concave portions of the first mounting portions 76b so that the mounting holes 93a and the mounting hole 72d face the fastening holes 76c. At this time, the internal peripheries of the internal fastening elements 93 are centered while in contact with the stepped portions 76f of the first mounting portions 76b. The bolts 80 are then mounted from one side to engage the sprocket 71, while the nuts 81 are mounted from the other side to engage the sprocket 71. The bolts 80 are turned with an Allen wrench while the nuts 81 are tightened with a special tool to mount the sprockets 71 and 72. The sprocket 73 is then fastened in to the second mounting portions 76d with the bolts 82.

When mounting of the sprockets 71-73 is complete, the sprocket mounting unit 76 is fastened to the main right crank arm part 77 by the lock ring 78, and the main right crank arm part 77 is fastened to the right end of the crankshaft 50 by the fastening bolts 59. Mounting of the crank unit 41 onto the bottom bracket 54 is thereby completed.

Figure 9:
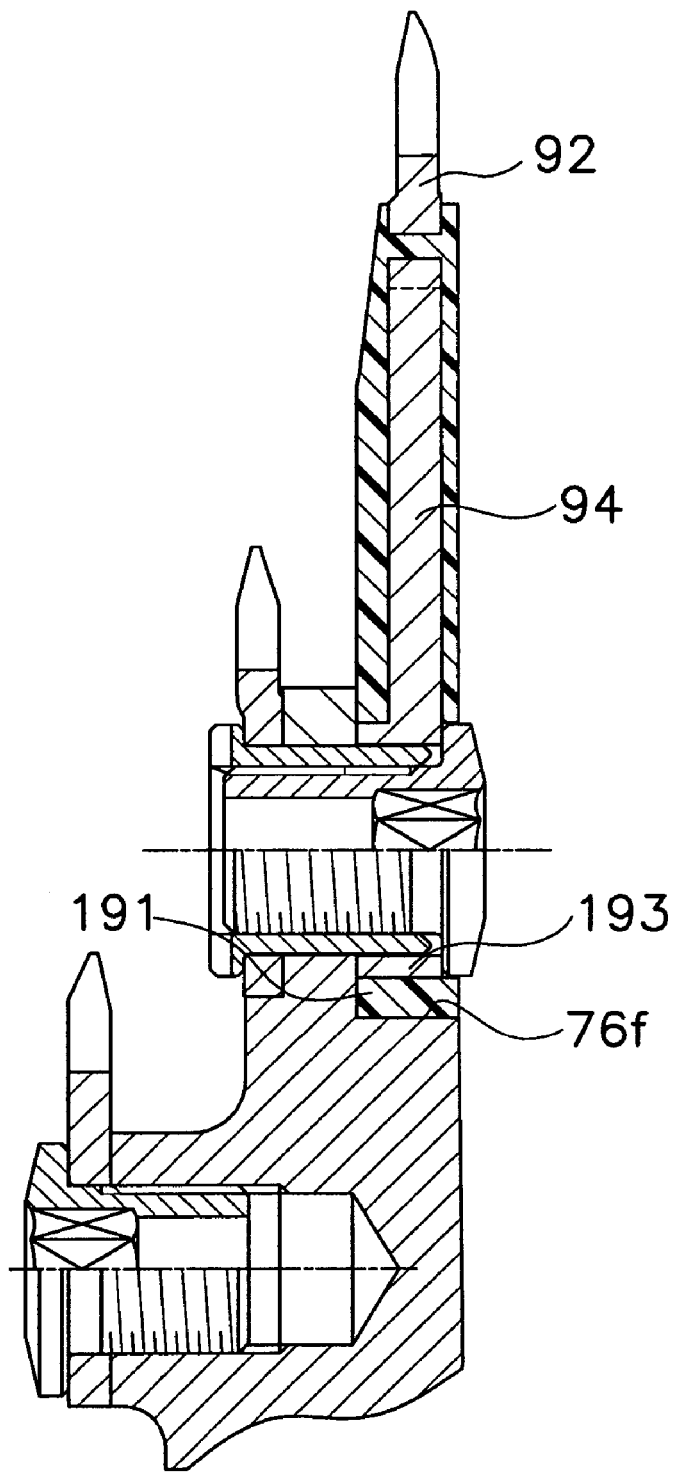
FIG. 9 is an enlarged, partial cross sectional view, similar to FIG. 6, of a portion of a front crankset in accordance with a second embodiment of the present invention.
Figure 10:
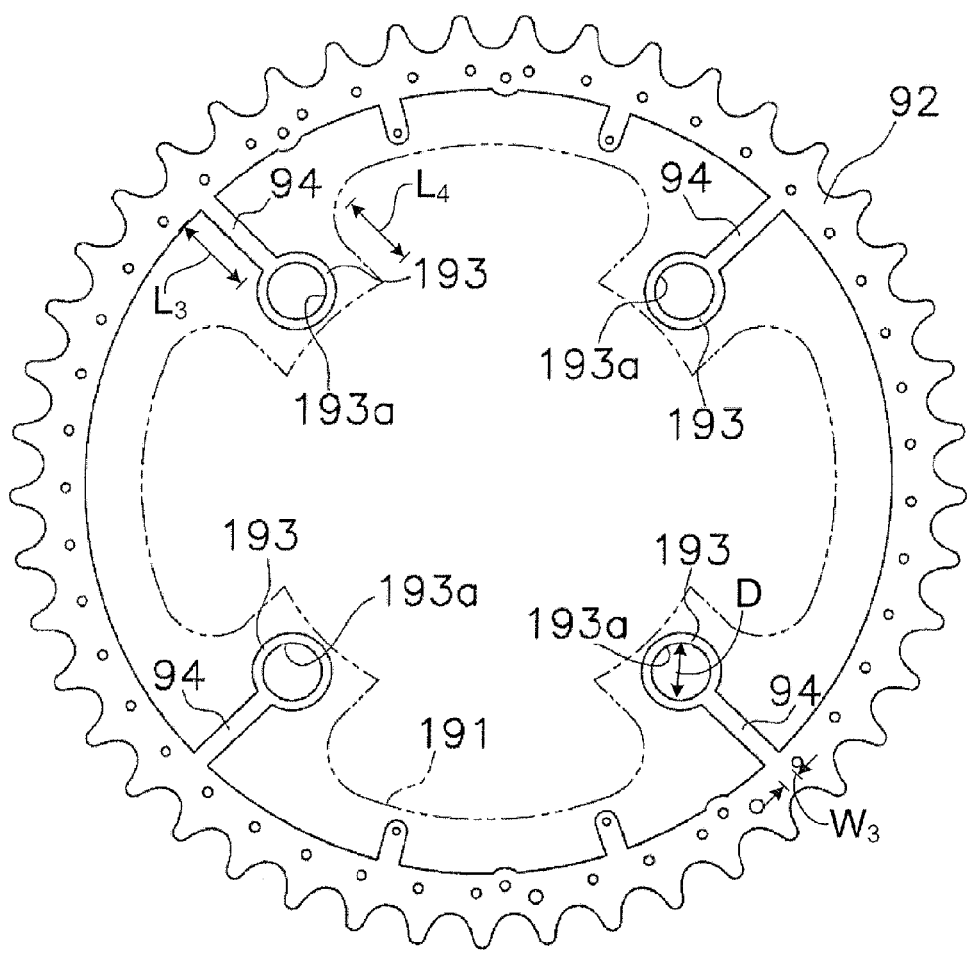
FIG. 10 is an outside elevational view, similar to FIG. 7, of the sprocket ring part of the large bicycle sprocket for the front crankset illustrated in FIG. 9 in accordance with the second embodiment of the present invention.

In the previous embodiment, the internal peripheries of the internal fastening elements 93 were formed into a shape that contact the stepped portions 76f of the first mounting portions 76b. However, the shapes of the internal fastening elements 93 are not limited to that of the previously discussed embodiment. For example, internal fastening elements 193 linked to the ring element 92 by the connecting elements 94 can be formed into ring shapes, as shown in FIGS. 9 and 10. Mounting holes 193a with a diameter D substantially equal to that of the fastening holes 76c are formed in the center of the internal fastening elements 193. As shown in FIG. 10, the connecting elements 94 have a radial length $L_3$ and a circumferential width $W_3$. The internal fastening elements 193 have an outer diameter $L_4$ that is the same whether measured in the circumferential direction or the radial direction. As indicated in FIG. 10, the radial length $L_3$ is greater than the outer diameter $L_4$ and the width $W_2$ is greater than the width $W_1$. In this case, the internal peripheries of the internal fastening elements 193 are also covered by a fastening part 191, and are not exposed so as to come into contact with the stepped portions 76f. Descriptions of members similar to those of the previous embodiment are omitted from the description of FIG. 9 and the subsequent diagrams, and also omitted are reference numerals corresponding to the members whose descriptions are omitted.

Figure 11:
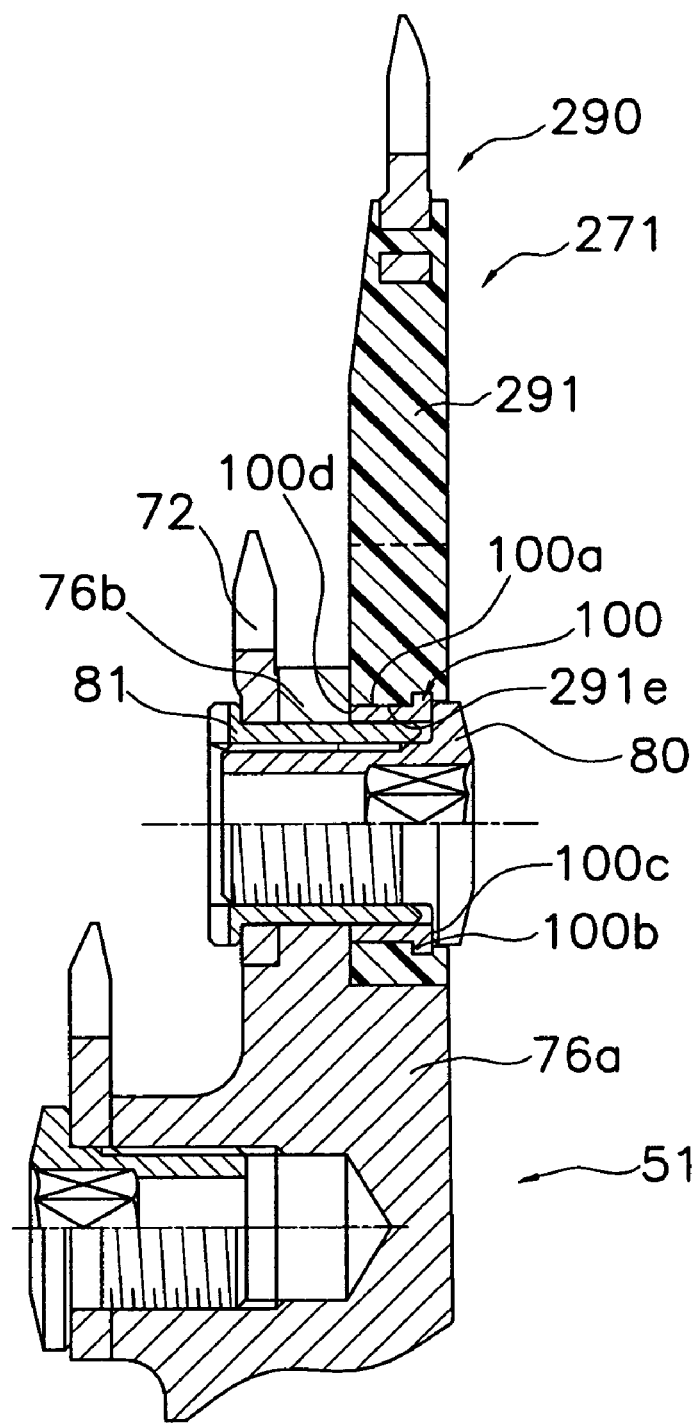
FIG. 11 is an enlarged, partial cross sectional view, similar to FIG. 6, of a portion of a front crankset in accordance with a third embodiment of the present invention.
Figure 12:
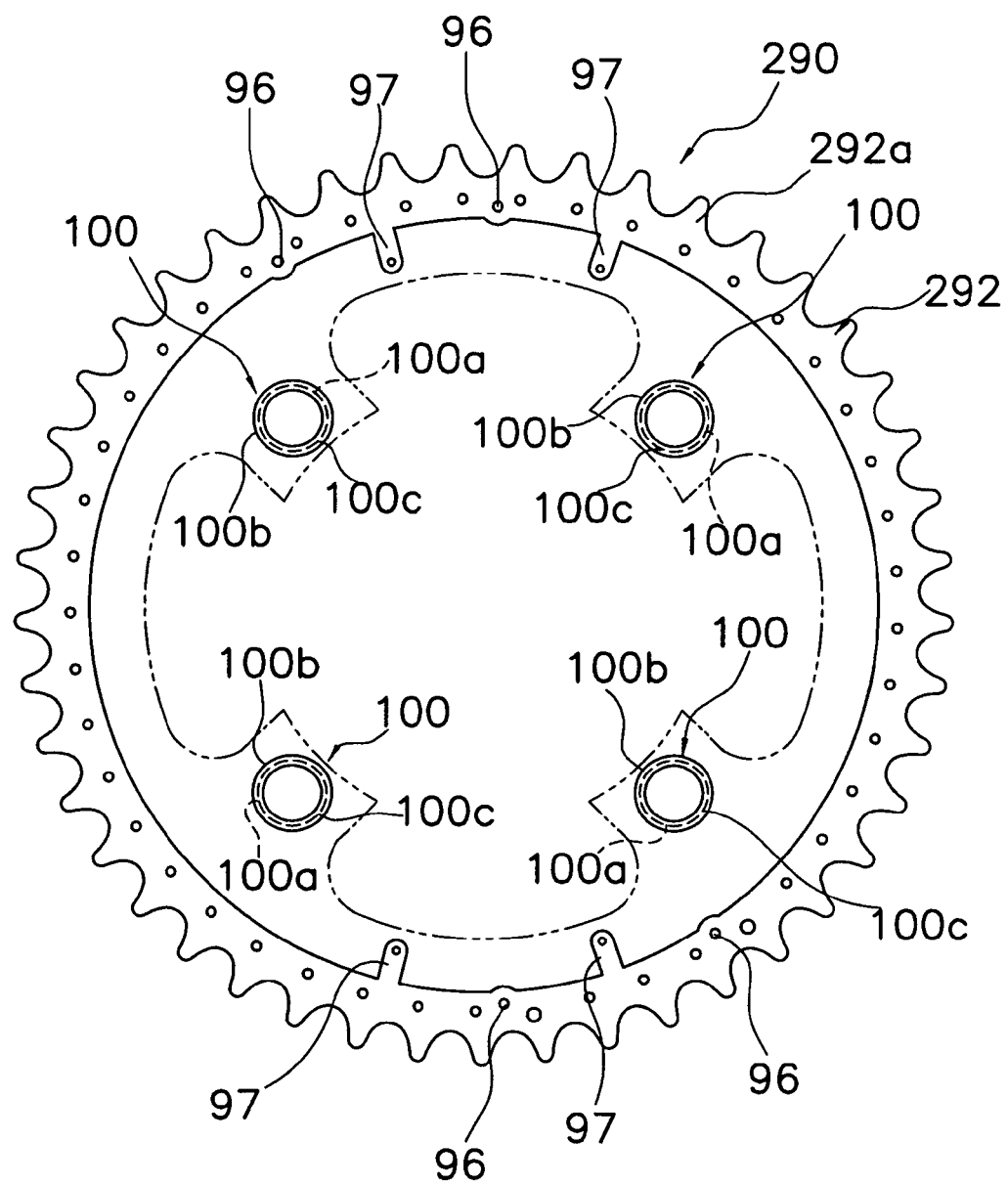
FIG. 12 is an outside elevational view, similar to FIG. 7, of the sprocket ring part of the large bicycle sprocket for the front crankset illustrated in FIG. 9 in accordance with the third embodiment of the present invention.

In the previous embodiments, the internal fastening elements 93 and 193 are formed integrally with the ring element 92. However, the cylindrical members 100 that correspond to the internal fastening elements can be formed separately, as shown in FIGS. 11 and 12.

A sprocket ring part 290 is made of an aluminum alloy with an anodic oxide coating formed on the surface, for example. The sprocket ring part 290 has a ring part 292 on which multiple sprocket teeth 292a are formed with a chain 44 (FIG. 1) wound around the external periphery, as shown in FIG. 12. The sprocket ring part 290 also has spike fastening structures 96 formed on the ring part 292, and sub-spike fastening structures 97 that are disposed at intervals from the internal peripheral side of the ring part 292 and are formed integrally with the ring part 292. The arrangement and shapes of the spike fastening structures 96 and the sub-spike fastening structures 97 are similar to those in the previous embodiments.

The cylindrical members 100 are made of an aluminum alloy, for example, and include cylindrical parts 100a and ridges 100b that are greater in diameter than the cylindrical parts 100a. The ridges 100b have first contact surfaces 100c on the outer surfaces for bearing the force from the bolts 80 while in contact with the heads 80a of the bolts 80. The outer peripheries of the ridges 100b reach farther out than the internal peripheral surfaces of the mounting holes 291e of the fastening parts 291. Therefore, the cylindrical members 100 are reliably fastened in place in the fastening parts 291 so that they are not likely to come loose and are incapable of moving in the axial direction. Also, the cylindrical parts 100a have, in the inner surfaces, second contact surfaces 100d that are in contact with the first mounting portions 76b of the arms 76a of the crankset 51. Since the first contact surfaces 100c of the metallic cylindrical members 100 are thus in contact with the heads 80a of the bolts 80, the cylindrical members 100 are not likely to deform even if great force is applied from the chain 44, or the bolts 80 are fastened with excessive torque. Also, since the second contact surfaces 100d of the metallic cylindrical members 100 are in contact with the metallic first mounting portions 76b, force is applied to the metallic cylindrical members 100 instead of the synthetic resinous fastening parts 291 when the sprocket 271 is fastened in place with the bolts 80. Therefore, the sections where the sprocket is fastened with the first mounting portions 76b are even less likely to deform.

The bolts 80 are mounted from the outer sides of the internal peripheries of the cylindrical members 100, and two sprockets 271 and 272 are fastened to both sides of the first mounting portions 76b by nuts mounted from the sprocket 272 side, which is mounted to the internal peripheral sides of the first mounting portions 76b.

The cylindrical members 100 are positioned and arranged in the metal mold during insert molding. Also, a circular diffusion layer in which a fine powder of triazine thiol is diffused by electroplating is formed on the outer peripheral surface and the outer surface, similar to the sprocket ring element 92.

In the previous embodiments, the anchor structure was configured with multiple through-holes 92d formed at intervals in the ring element 92 in the circumferential direction, but the anchor structure may also be configured with multiple concavities and convexities formed at intervals in the internal peripheral surface of the ring element 92 in the circumferential direction.

In the previous embodiments, the sprocket of a mountain bike was described as an example, but the present invention can be applied to all bicycles.

In the previous embodiments, the present invention was described using as an example a sprocket mounted on a crank unit 41 wherein a crankset 51 having a separate main right crank arm part 77 is fastened to a crankshaft by bolts, but the present invention can also be applied to a sprocket mounted on a crank unit wherein a gear crank is fastened by crimping to a hollow cylindrical crankshaft across the entire length, or a crank unit wherein a gear crank is fastened to a crankshaft by bolts. The present invention can also be applied to a sprocket mounted on a small gear 43. Furthermore, the sprocket 72 may be configured from a sprocket ring part made of an aluminum alloy and a fastening part made of a synthetic resin.

In the previous embodiments, the sprocket ring part was made of an aluminum alloy, and the internal fastening elements were made of a polyamide-based synthetic resin, but the sprocket ring part may be made of any material as long as it is lightweight and hard, and the fastening part may be made of any lightweight synthetic resin.

In the previous embodiments, the sprocket ring part was formed by press punching an aluminum plate (metal plate), but the method of forming the sprocket ring part is not limited to that of the previous embodiments.

In the previous embodiments, the cylindrical members were configured with a ridged cylindrical shape, but the cylindrical members do not need to be provided with ridges.

In the previous embodiments, the sprocket ring part and the fastening part were formed integrally, but the fastening part can be fastened to the sprocket ring part by crimping, screwing or another such fastening method.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle sprocket comprising:
a metallic sprocket ring part including a ring element with a plurality of sprocket teeth located on an outer periphery of the ring element, a plurality of connecting elements located on an inner periphery of the ring element extending in a radial direction inwardly from the ring element and a plurality of internal fastening elements located on radial inner ends of the connecting elements, respectively, the internal fastening elements being configured for fastening to a bicycle sprocket unit, with the ring element, the plurality of connecting elements and the plurality of internal fastening elements being unitarily formed as a single element, the connecting elements having a first width measured in a circumferential direction, the internal fastening elements having a second width measured in the circumferential direction with the second width being greater than the first width;
a synthetic resin fastening part non-movably formed on both axial faces of the sprocket ring part at a location radially inwardly of the sprocket teeth so as to cover at least a portion of the inner periphery of the ring element, the connecting elements, and the internal fastening elements, the synthetic resin fastening part being a material providing rigid reinforcement to the ring element, the connecting elements and the fastening elements of the metallic sprocket ring part.

2. The bicycle sprocket according to claim 1, wherein the internal fastening elements are disposed at an interval from the ring element; and
the connecting elements extend from the inner periphery of the ring element in a straight line along the radial direction towards the internal fastening elements.

3. The bicycle sprocket according to claim 1, wherein the ring element further includes a plurality of spike fastening structures configured to fasten spike pins.

4. The bicycle sprocket according to claim 3, wherein the ring element further includes a plurality of sub-spike fastening structures integrally formed with the ring element and configured to fasten sub-spike pins at circumferentially spaced intervals of the ring element.

5. The bicycle sprocket according to claim 1, wherein the sprocket ring part is a press punched metal plate.

6. The bicycle sprocket according to claim 1, wherein the sprocket ring part further includes an anchor structure configured to connect the fastening part in a non-rotatable manner to the sprocket ring part.

7. The bicycle sprocket according to claim 6, wherein the anchor structure comprises a plurality of through-holes formed at circumferentially spaced apart intervals in a circumferential direction of the ring element.

8. The bicycle sprocket according to claim 1, wherein the fastening part comprises a carbon fiber-containing resin obtained by impregnating a polyamide-based synthetic resin with carbon fiber filler.

9. The bicycle sprocket according to claim 1, wherein the sprocket ring part is made of an aluminum alloy with an anodic oxide coating formed on the surface.

10. The bicycle sprocket according to claim 1, wherein the fastening part comprises a carbon fiber-containing resin obtained by impregnating a polyamide-based synthetic resin with carbon fiber filler.

11. The bicycle sprocket according to claim 1, wherein the sprocket ring part is made of an aluminum alloy with an anodic oxide coating formed on the surface, 12. The bicycle sprocket according to claim 1, wherein each of the internal fastening elements includes a mounting hole having a diameter larger than the first width.

13. The bicycle sprocket according to claim 1, wherein the connecting elements having a first length measured along the radial direction,
the internal fastening elements having a second length measured along the radial direction with the second length being greater than the first length.

14. The bicycle sprocket according to claim 1, wherein the connecting elements having a first length measured along the radial direction,
the internal fastening elements having a second length measured along the radial direction with the first length being greater than the second length.

15. A bicycle sprocket comprising:
a metallic sprocket ring part including a ring element with a plurality of sprocket teeth located on an outer periphery of the ring element, a plurality of connecting elements located on an inner periphery of the ring element and a plurality of internal fastening elements located on radial inner ends of the connecting elements, respectively, the internal fastening elements being configured for fastening to a bicycle sprocket unit, with the ring element, the plurality of connecting elements and the plurality of internal fastening elements being unitarily formed as a single element, with each of the internal fastening elements including a fastener mounting hole, and a circumference element surrounding a corresponding one of the fastener mounting holes; and a synthetic resin fastening part non-movably formed on both axial faces of the sprocket ring part at a location radially inwardly of the sprocket teeth so as to cover at least a portion of the inner periphery of the ring element, the connecting elements, and the internal fastening elements, the synthetic resin fastening part being a material providing rigid reinforcement to the ring element, the connecting elements and the fastening elements of the metallic sprocket ring part.

16. A bicycle sprocket comprising:

a metallic sprocket ring part including a ring element with a plurality of sprocket teeth located on an outer periphery of the ring element, a plurality of spike fastening structures configured to fasten spike pins on the ring element, and a plurality of sub-spike fastening structures integrally formed with the ring element on an inner periphery of the ring element and configured to fasten sub-spike pins at circumferentially spaced intervals along of the inner periphery of the ring element, with the ring element, the plurality of spike structures and the plurality of sub-spike fastening structures being unitarily formed as a single element;

a synthetic resin fastening part non-movably formed on both axial faces of the sprocket ring part at a location radially inwardly of the sprocket teeth so as to cover at least the inner periphery of the ring element and the sub-spike fastening structures, the synthetic resin fastening part being a material providing rigid reinforcement to the ring element and the sub-spike fastening elements of the metallic sprocket ring part; and a plurality of metallic cylindrical members disposed radially inward and spaced apart from the ring element and circumferentially spaced apart from one another, the cylindric members being retained by the fastening part at locations corresponding to fastener mounting holes formed in the fastening part, the cylindrical members having contact surfaces configured and arranged to bear a tightening force from a corresponding one of a plurality of fastening members received in the fastener mounting holes for attachment to a bicycle sprocket unit.

17. The bicycle sprocket according to claim 16, wherein the sprocket ring part is a press punched metal plate.

18. The bicycle sprocket according to claim 16, wherein the sprocket ring part further includes an anchor structure configured to connect the fastening part in a non-rotatable manner to the sprocket ring part.

19. The bicycle sprocket according to claim 18, wherein the anchor structure comprises a plurality of through-holes formed at circumferentially spaced apart intervals in a circumferential direction of the ring element.

* * * * *